United States Patent

Sagawa

(10) Patent No.: US 6,822,422 B2
(45) Date of Patent: Nov. 23, 2004

(54) BATTERY RECYCLE SYSTEM

(75) Inventor: Rumi Sagawa, Saitama (JP)

(73) Assignee: NEC Corporation, Tokyo (JP)

( * ) Notice: Subject to any disclaimer, the term of this patent is extended or adjusted under 35 U.S.C. 154(b) by 36 days.

(21) Appl. No.: 10/373,183

(22) Filed: Feb. 26, 2003

(65) Prior Publication Data

US 2003/0170529 A1 Sep. 11, 2003

(30) Foreign Application Priority Data

Mar. 7, 2002 (JP) ........................................ 2002-061500

(51) Int. Cl.[7] .............................. H02J 7/00; G06F 7/08; G06F 17/00; H04M 11/00; H04M 17/00
(52) U.S. Cl. ...................... 320/109; 235/381; 700/231; 379/91.02; 379/143
(58) Field of Search ................................ 320/109, 110, 320/132, 106, DIG. 12; 702/63; 340/5.9; 700/231; 455/406; 379/90.01, 91.01; 221/135; 701/200

(56) References Cited

U.S. PATENT DOCUMENTS

| | | | | |
|---|---|---|---|---|
| 4,767,917 A | * | 8/1988 | Ushikubo | 235/381 |
| 4,951,308 A | * | 8/1990 | Bishop et al. | 379/91.01 |
| 5,303,297 A | * | 4/1994 | Hillis | 455/406 |
| 5,349,535 A | * | 9/1994 | Gupta | 702/63 |
| 5,461,299 A | * | 10/1995 | Bruni | 320/108 |
| 5,544,784 A | * | 8/1996 | Malaspina | 221/135 |
| 5,673,306 A | * | 9/1997 | Amadon et al. | 455/406 |
| 5,684,379 A | * | 11/1997 | Svedoff | 320/125 |
| 5,694,019 A | * | 12/1997 | Uchida et al. | 320/106 |
| 5,744,933 A | * | 4/1998 | Inoue et al. | 320/110 |
| 6,154,006 A | * | 11/2000 | Hatanaka et al. | 320/109 |
| 6,157,315 A | * | 12/2000 | Kokubo et al. | 340/5.42 |
| 6,185,501 B1 | * | 2/2001 | Smith et al. | 701/200 |
| 6,417,647 B2 | * | 7/2002 | Kaji et al. | 320/132 |
| 6,618,644 B2 | * | 9/2003 | Bean | 700/231 |

FOREIGN PATENT DOCUMENTS

| | | | |
|---|---|---|---|
| EP | 156505 | * | 10/1985 |
| EP | 693813 | * | 4/1996 |
| JP | 07-308029 | | 11/1995 |
| JP | 2726942 | | 3/1998 |
| JP | 2001-266954 | | 9/2001 |
| WO | WO-85/03790 | * | 2/1984 |
| WO | WO-91/12094 | * | 7/1991 |

* cited by examiner

Primary Examiner—Pia Tibbits
(74) Attorney, Agent, or Firm—Whitham, Curtis & Christofferson P.C.

(57) ABSTRACT

A battery recycle system includes a vending machine for vending secondary batteries. The vending machine has therein a telecommunication terminal connected to a server provided in a secondary battery for receiving information of minimum quality of a typical used secondary battery. Upon receiving a used battery from a user, the vending machine supplies a charged battery to the user at a reduced cost corresponding to the quality of the used battery. The used battery is charged and stocked for a next user.

8 Claims, 4 Drawing Sheets

BATTERY RECYCLE SYSTEM

BACKGROUND OF THE INVENTION (a) Field of the Invention

The present invention relates to a battery recycle system and, more particularly, to a battery recycle system for use in recycle of secondary batteries such as used in a cellular phone.

(b) Description of the Related Art

A cellular phone uses a secondary battery as a power source for operation thereof. The secondary battery used in the cellular phone is repeatedly charged and discharged, and has a relatively long operating time so long as the cellular phone is used for normal operations such as waiting, calling and message transmission. However, the secondary batteries used in cellular phones having numerous functions, such as accessing to a homepage by using a browser through the internet, reproducing a music, signal processing for image data or playing a game, have reduced operating time due to the operation for the increased number of functions. After the cellular phone is used for operating such functions, the remaining charge in the secondary battery may be too low to operate the cellular phone even in a waiting mode.

Thus, it may be considered to recommend a user having such a higher-function cellular phone to carry another secondary battery or a battery charger therewith for replacing or charging the discharged battery.

However, carrying another secondary battery is an economical burden for the user. In addition, if the user throws off or merely stores the discharged battery after the replacement, it raises an environmental problems due to the waste of the resource. On the other hand, if the user carries a battery charger, the battery charger requires a power source for the charging. Even if the user manages to use a power source for the charging, the charging itself takes a relatively long time to the user.

Thus, it is desired to prevent the cellular phone from being out of operation for a long time due to the discharge of the secondary battery even after operating many functions.

SUMMARY OF THE INVENTION

It is an object of the present invention to provide a battery recycle system which is capable of solving the above problems and recycling the used secondary battery with less burden on the user and environment.

The present invention provides a battery recycle system including: a first server connected to a network and storing information of a minimum quality requirements of a typically used secondary battery; and a vending machine including a telecommunication terminal connected to the network to receive the information of minimum quality requirements from the first server, an inspecting device for inspecting a quality of a used secondary battery thrown into the vending machine in comparison with the minimum quality requirements to thereby judge the used secondary battery as a reusable battery or a non-reusable battery, a charging device for charging the reusable battery to obtain a charged battery, a storage device for storing the charged battery and new secondary batteries, and a fetching device for fetching one of the stored batteries from the storage device.

In accordance with the battery recycle system of the present invention, the vending machine receives a used secondary battery from a user, inspects the quality of the used secondary battery based on the minimum quality requirements provided from the first server and charges a reusable battery and stores the charged battery as a secondary battery to be supplied to another user. The first user receives a charged battery in exchange for the used secondary battery without awaiting the charging. The provision of information of the minimum quality requirements from the first server allows the vending machine to inspect a new type of used batteries without manually modifying data for the minimum quality requirements at the vending machine.

PREFERRED EMBODIMENTS OF THE INVENTION

Figure 1:
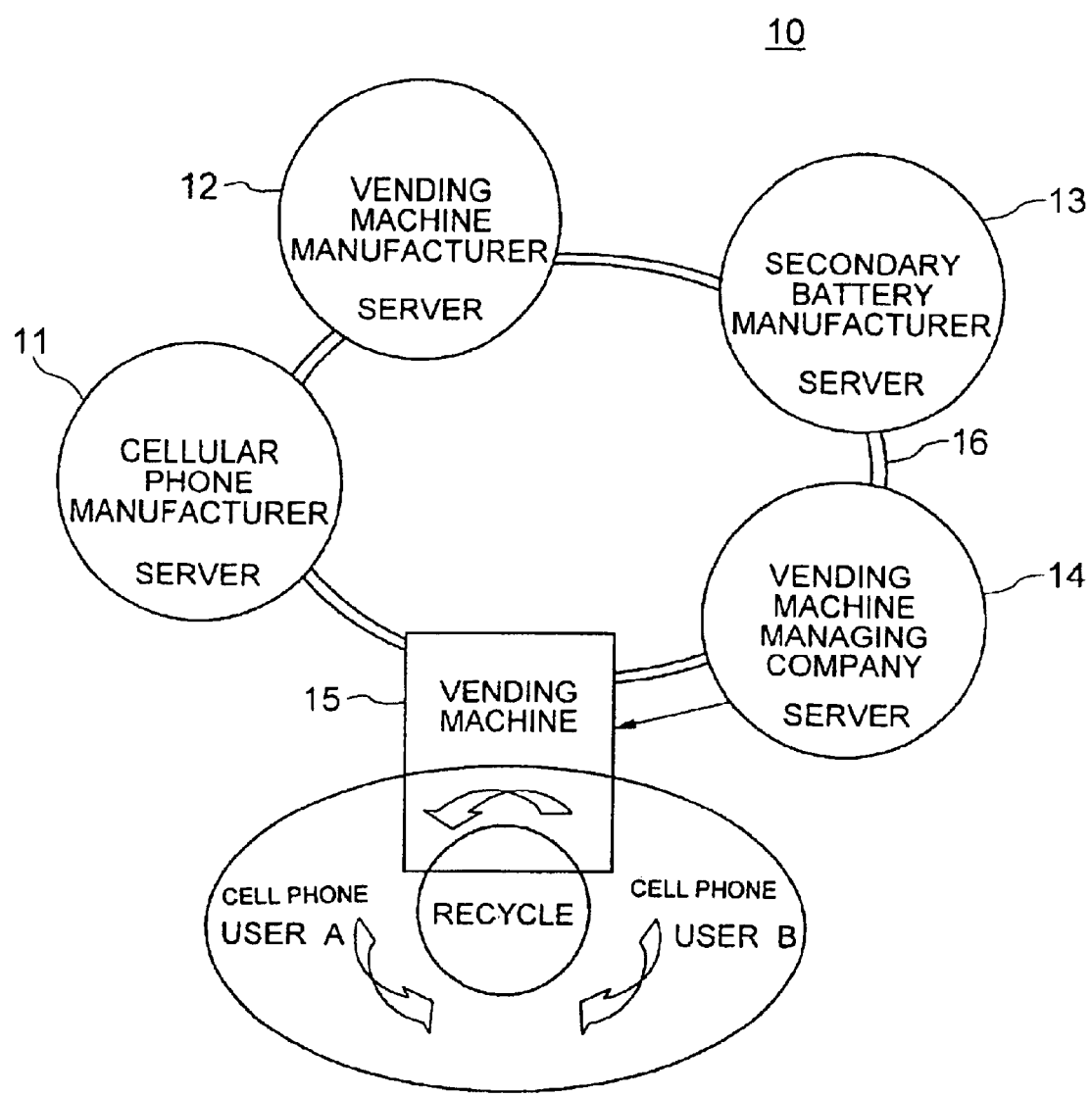
FIG. 1 is a block diagram of a battery recycle system according to an embodiment of the present invention.

Now, the present invention is more specifically described with reference to accompanying drawings. Referring to FIG. 1, a battery recycle system, generally designated by numeral 10, according to an embodiment of the present invention includes a server 11 owned by a cellular phone manufacturer, a server 12 owned by a vending machine manufacturer, a server 13 owned by a secondary battery manufacturer, and a server 14 owned by a vending machine managing company, which are interconnected through a telecommunication network 16 such as the internet. The battery recycle system further includes a plurality of vending machines 15 connected through the telecommunication system to the servers 11 to 14.

The secondary battery manufacturer supplies secondary batteries to the cellular phone manufacturer. The cellular phone manufacturer delivers information of the secondary batteries such as model number, dimensions and specification thereof. The vending machine manufacturer manufactures the vending machines based on the information delivered from the cellular phone manufacturer and supplies the product vending machines to the vending machine managing company.

The vending machine managing company places the vending machines at desired locations and set these vending machines to sell the secondary batteries supplied from the secondary battery manufacturer. A user having a cellular phone manufactured by the cellular phone manufacturer can use one of the vending machines 15 to buy a secondary battery while being allowed to recycle a used battery.

All the servers 11 to 14 in the battery recycle system 10 are interconnected through the internet 16, as described above. The servers 11 and 13 exchange therebetween information of the supply of the secondary batteries, the servers 11 and 12 exchange therebetween information of the secondary batteries, and the servers 12 and 14 exchange therebetween information of the vending machines 15.

The secondary battery manufacturer supplies secondary batteries to the cellular phone manufacturer as well as to the vending machine managing company. The cellular phone manufacturer delivers information of the shape, dimensions and types of the secondary batteries used in the new type of the cellular phones to the vending machine manufacturer, whereby the vending machines 15 can vend secondary batteries used in the new type of the cellular phone directly after shipment of the new type of the cellular phone.

The vending machine manufacturer supplies new type of the vending machines to the vending machine managing company, the new type of the vending machine being manufactured based on the information offered by the cellular phone manufacturer. The vending machine managing company places the vending machines at desired locations and manages the vending machines.

A user wishing to buy a secondary battery for use in a cellular phone throws the own used battery into one of the vending machines. The used battery thrown into the vending machine is recharged in the vending machine and is sold to another user in the battery recycle system. In this system, the vending machine managing company makes a profit by selling new or used secondary batteries to the users, and the vending machine manufacturer makes a profit by selling the vending machines to the vending machine managing company.

The secondary battery manufacturer makes a profit by selling secondary batteries to the vending machine managing company in addition to the cellular phone manufacturer. The cellular phone manufacturer makes a profit by offering information of the type and dimensions of the secondary batteries to the vending machine manufacturer. The battery recycle system of the present embodiment can quickly and flexibly respond to the demand from the market by sharing information of the secondary batteries while using the internet.

Figure 2:
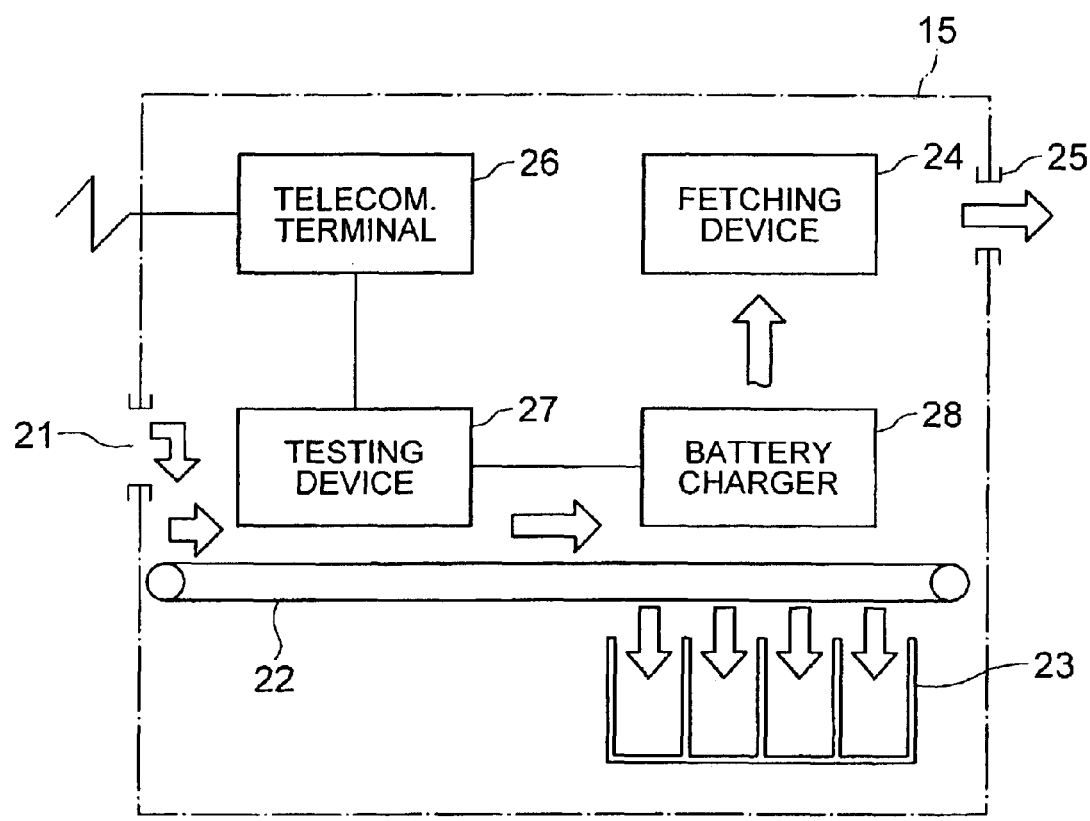
FIG. 2 is a schematic block diagram of the vending machine shown in FIG. 1.

Referring to FIG. 2, the vending machine 15 includes a battery inlet slot 21 for throwing therethrough a used battery, a conveyer 22 for conveying the used battery, a storage device 23 for storing the used battery and new batteries together for each type of the batteries, and a fetching device 24 for fetching a desired battery from the storage device 23 to deliver the desired battery to a user through a battery outlet slot 25.

The vending machine 15 also includes a telecommunication terminal 26 connected to the network to receive the information from the servers 11 to 14, a testing device 27 for testing the quality of a used secondary battery thrown into the vending machine 15 comparing with the minimum quality requirements to thereby judge the used secondary battery as a reusable battery or a non-reusable battery, and a battery charger 28 for charging the reusable battery to obtain a charted battery.

Figure 3:
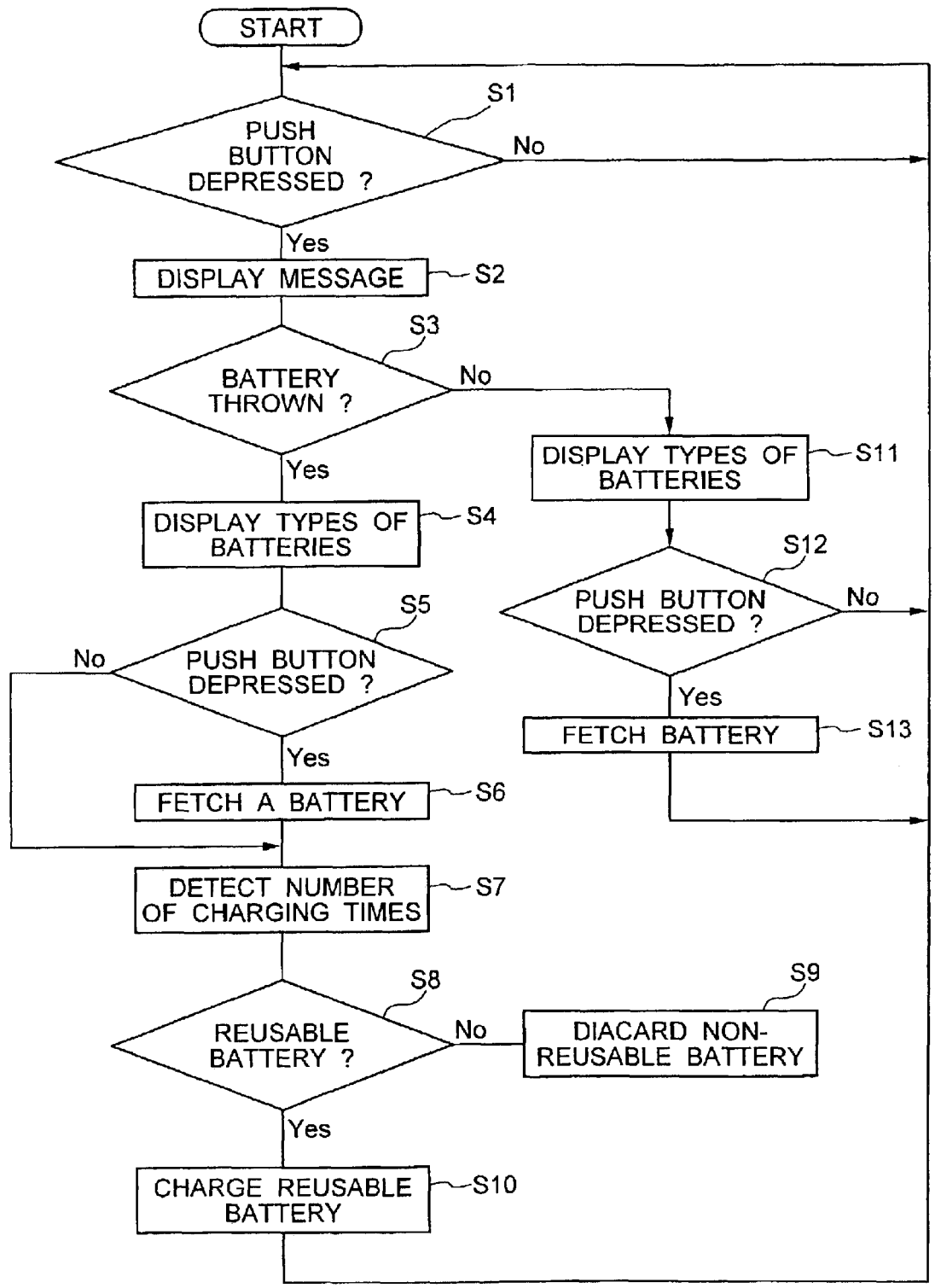
FIG. 3 is a flowchart of operation of the battery recycle system of FIG. 1.

Referring to FIG. 3, there is shown a flowchart of operation of the vending machine 15 of FIG. 2. When the push button for purchase of a battery is depressed by a user, the depression is detected (step S1) and a message such as "throw used battery if any" is displayed (step S2) on the front display panel of the vending machine. In an alternative, a coin or bill thrown into the vending machine 15 may be detected instead of depression of the push button because it is considered to indicate the intention of purchase of a battery.

If a used battery is thrown into the vending machine (step S3) through the inlet slot 21 after the message display of step S2, the vending machine 15 then displays the types of the secondary batteries available at that time in the vending machine 15 (step S4). If the user depresses a push button corresponding to a desired battery (step S5), the fetching device 24 of the vending machine 15 responds to the depression to provide the desired battery (step S6) through the battery outlet slot 25.

Thereafter, the testing device 27 detects the number of charging times to which the used battery was subjected (step S7). If the user does not depress the push button corresponding to the desired battery in step S5, the step S7 is performed after a specified time length elapsed from the message display in step S4. The testing device 27 then judges whether or not the used battery can be reused based on the number of charging times thus detected (step S8). The number of charging times may be marked on the outer surface of the battery by providing the battery charger 28 with such a function. The information of the upper limit of the number of charging times, which assures a minimum quality requirements of the battery, is provided by the secondary battery manufacturer and stored in the testing device 27 as a setting for the maximum number of the charging times safely available for the battery.

If the used battery is judged as a reusable battery in step S8, the process advances to step S10, wherein the used battery is mounted on and charged by the battery charger 28. On the other hand, if the used battery is judged as a non-reusable battery in step S8, the used battery is introduced into a waste box (not shown in FIG. 2) and discarded by an operator of the vending machine 15 working for the vending machine managing company.

It is to be noted that if the depression of the push button corresponding to a desired battery is not detected in step S5 within the specified time length, the vending machine assumes that the user does not wish to buy a battery in exchange of the thrown used battery. In such a case, if money has been thrown into the vending machine, the money is returned to the user. In addition, the vending machine 15 may provide the user with a pseudo coin or rebate check that can be used in the vending machines for the return of the used battery.

If a used battery is not detected in step S3, the process advances to step S11, wherein the vending machine 15 displays the types of the secondary batteries that are stored in the storage device 23 for selling. If it is detected in step S12 that the user depressed a push button corresponding to a desired secondary battery, the desired battery is provided by the fetching device 24 through the battery outlet slot 25 to the user (step S13) after assuring that the user has thrown money for the battery.

The vending machine 15 sets a difference between the price for the case of step S11 to S13 after the used battery is not detected in step S3 and the price for the case of steps S4 to S10 after the used battery is detected in step S3. This reduces the inequality between the presence and absence of the used battery that the vending machine 15 receives from the user.

It is to be noted that the above embodiment can be modified if desired. For example, the flowchart in the vending machine 15 of the embodiment has a branch between the presence and the absence of the used battery in step S3; however, step S2 can be replaced by the steps of displaying a message that inquires whether or not the user has a used battery for replacement, and detecting whether or not the user has the used battery by detecting depression of a push button for this purpose. In such a case, the process advances to step S3 if the user has a used battery, whereas the process advances to step S11 if the user does not have a used battery. Step S3 may be used for awaiting the throw-in of the used battery in the former case.

Figure 4:
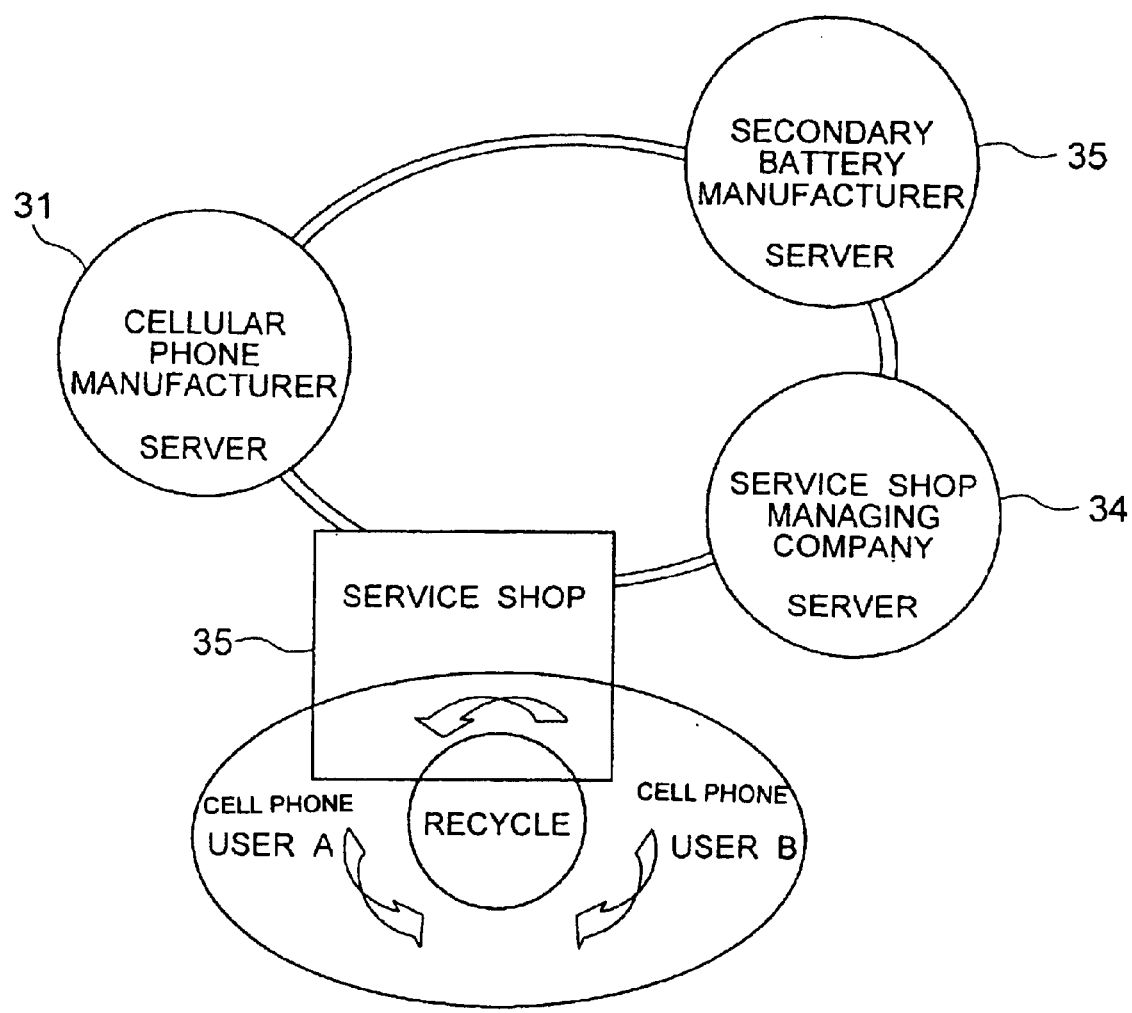
FIG. 4 is a block diagram of another battery recycle system according to another embodiment of the present invention.

In the above embodiment, vending machines are used in the battery recycle system; however, service shops such as a convenience store may be used instead of the vending machines. FIG. 4 shows such a system, wherein a server 31 in a cellular phone manufacturer, a server 33 in a secondary battery manufacturer and a server in a convenience store managing company 34 are interconnected via a communication network such as the internet. The service shop 5 includes a telecommunication terminal, a testing device, battery charger and a storage device, which are similar to those provided in the vending machine of FIG. 2.

The secondary battery manufacturer supplies secondary batteries to the cellular phone manufacturer, which supplies battery chargers to the convenience store managing company. The secondary battery manufacturer also supplies secondary batteries to the convenience store managing company.

In the convenience store, a clerk receives a used battery from a user of a cellular phone and provides in turn another charged battery to the user. The qualities of the used battery and the charged battery are judged by the clerk using the testing device storing the quality data requirements from the secondary battery manufacturer. For example, the quality of the battery is judged based on number of charging times indicated on the surface of the battery. The information of the upper limit of the number of charging times may be provided beforehand by the server in the secondary battery manufacturer.

In the above embodiment and the modification therefrom, the cellular phone preferably has a GPS (global positioning system) function that detects the current position of the cellular phone. In this case, after the cellular phone transmits the own position to the vending machine managing company or the convenience store managing company, the server in the managing company delivers to the user information of the vending machine or the convenience store that is nearest to the cellular phone.

The convenience store may be replaced with or added by a gasoline stand, cellular phone shop and/or fast-food shop. The quality of the battery may be detected by detecting the storage capacity or open circuit voltage of the secondary battery instead of detecting the number of charging times. In such a case, if the storage capacity of the battery is lower than a threshold, or if the open circuit voltage thereof is lower than a threshold, the battery may be judged as a non-reusable battery.

Since the above embodiments are described only for examples, the present invention is not limited to the above embodiments and various modifications or alterations can be easily made therefrom by those skilled in the art without departing from the scope of the present invention.

What is claimed is:

1. A battery recycle system comprising:
   a first server connected to a network and storing information of a minimum quality requirements of a secondary battery;
   a second server connected to said network for receiving information of dimensions of secondary batteries stored in said first server;
   a third server storing information of types of batteries used in cellular phones, and connected to said network for transmitting information of said types of batteries to said second server;
   a fourth server for receiving information of supply of secondary batteries from said first server; and
   a plurality of vending machines each including a telecommunication terminal connected to said network to receive said information of minimum quality requirements from said first server, an inspecting device for comparing a quality of a used secondary battery thrown into said vending machine with said minimum quality requirements to judge said used secondary battery as a reusable battery or a non-reusable battery,
   a charging device for charging the reusable battery to obtain a charged battery,
   a storage device for storing the charged battery and new secondary batteries, and
   a fetching device for fetching one of said stored batteries from said storage device.

2. The battery recycle system according to claim 1, wherein said battery charger has a function for marking information of number of charging times onto said reusable battery upon charging thereof.

3. The battery recycle system according to claim 1, wherein said fourth server stores information of locations of a plurality of said vending machines, and informs one of said locations of said vending machines nearest to a cellular phone upon receiving information of a position of said cellular phone.

4. The battery recycle system according to claim 3, wherein said cellular phone has a GPS (Global Positioning System) function.

5. A battery recycle system comprising:
   a first server connected to a network and storing information of a minimum quality requirements of a secondary battery;
   a second server storing information of types of batteries used in cellular phones and connected to said network for transmitting information of said types of batteries to said telecommunication terminal;
   a third server for receiving information of supply of secondary batteries from said first server; and
   a service shop including a telecommunication terminal connected to said network to receive said information of minimum quality from said first server, an inspecting device for comparing a quality of a used secondary battery with said minimum quality requirements to judge said used secondary battery as a reusable battery or a non-reusable battery,
   a charging device for charging the reusable battery to obtain a charged battery, and
   a storage device for storing the charged battery and new secondary batteries.

6. The battery recycle system according to claim 5, wherein said battery charger has a function for marking information of number of charging times onto said reusable battery upon charging thereof.

7. The battery recycle system according to claim 5, wherein said third server stores information of locations of a plurality of said service shops, and informs one of said locations of said service shops nearest to a cellular phone upon receiving information of a position of said cellular phone.

8. The battery recycle system according to claim 7, wherein said cellular phone has a GPS (Global Positioning System function.

* * * * *